(12) United States Patent
Valentini

(10) Patent No.: US 12,240,702 B2
(45) Date of Patent: Mar. 4, 2025

(54) ROLLER CONVEYOR

(71) Applicant: SYSTEM CERAMICS S.P.A., Fiorano Modenese (IT)

(72) Inventor: Marco Valentini, Casalgrande (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 0 days.

(21) Appl. No.: 18/550,351

(22) PCT Filed: Apr. 13, 2022

(86) PCT No.: PCT/IB2022/053475
§ 371 (c)(1),
(2) Date: Sep. 13, 2023

(87) PCT Pub. No.: WO2022/224089
PCT Pub. Date: Oct. 27, 2022

(65) Prior Publication Data
US 2024/0150127 A1 May 9, 2024

(30) Foreign Application Priority Data
Apr. 21, 2021 (IT) .................. 102021000010166

(51) Int. Cl.
*B65G 13/071* (2006.01)
*B65G 13/04* (2006.01)
*B65G 13/07* (2006.01)

(52) U.S. Cl.
CPC .......... *B65G 13/071* (2013.01); *B65G 13/04* (2013.01); *B65G 13/07* (2013.01)

(58) Field of Classification Search
CPC ....... B65G 13/07; B65G 13/071; B65G 13/04
(Continued)

(56) References Cited

U.S. PATENT DOCUMENTS 1,614,816 A * 1/1927 York .................. B65G 13/071
198/790
2,822,077 A * 2/1958 Lorig .................. B65G 13/071
198/790
(Continued)

FOREIGN PATENT DOCUMENTS

FR 1528801 A 6/1968
FR 2291925 A1 6/1976
(Continued)

OTHER PUBLICATIONS

International Search Report and Written Opinion from PCT/IB2022/053475, Date of Completion of International Search: Jun. 9, 2022, Date of Mailing of International Search Report: Jun. 22, 2022, 10 pages.

*Primary Examiner* — Mark A Deuble
(74) *Attorney, Agent, or Firm* — Chrisman Gallo Tochtrop LLC

(57) ABSTRACT

Roller conveyor, comprising: a plurality of driven rollers (2) each of which has a cylindrical outer surface (21), arranged allow the support of an object to be transported, which is tangential to a transport plane (a) on which the transport of the objects occurs; a motor (3); a transmission element (4), which kinematically connects the motor (3) to the driven rollers (2) and is placed in contact with a portion of the outer surface (21) tangential to the transport plane (a); a plurality of presser rollers (5), placed in contact with the transmission element (4), on the opposite side with respect to the driven rollers (2), each of said presser rollers (5) being arranged abutting a respective driven roller (2), so as to press the transmission element (4) between itself and the respective driven roller (2).

7 Claims, 5 Drawing Sheets

(58) Field of Classification Search
USPC .................. 198/781.03, 781.09, 781.1, 790
See application file for complete search history.

(56) References Cited

U.S. PATENT DOCUMENTS

| | | | | |
|---|---|---|---|---|
| 3,344,903 | A * | 10/1967 | Holm ................... | B65G 13/071 |
| | | | | 65/348 |
| 4,297,121 | A * | 10/1981 | Rhonehouse ........... | C03B 29/08 |
| | | | | 65/351 |
| RE32,497 | E | 9/1987 | Canfield | |
| 5,040,669 | A * | 8/1991 | Blocker ................. | B65G 13/07 |
| | | | | 198/782 |
| 5,105,935 | A * | 4/1992 | Kohl .................... | B65G 47/261 |
| | | | | 198/781.08 |
| 6,223,888 | B1 * | 5/2001 | Jahns ................... | B65G 47/261 |
| | | | | 198/781.09 |
| 7,748,520 | B1 * | 7/2010 | Helgerson .............. | B65G 13/071 |
| | | | | 198/817 |
| 11,325,784 | B2 * | 5/2022 | Valentini .............. | B65G 13/071 |
| 2007/0261938 | A1 | 11/2007 | Hirasawa et al. | |
| 2011/0089002 | A1 * | 4/2011 | Anderson .............. | B65G 13/07 |
| | | | | 198/787 |
| 2013/0048469 | A1 * | 2/2013 | Rogers ................. | B65G 13/071 |
| | | | | 198/608 |
| 2015/0041284 | A1 * | 2/2015 | Pfeiffer ................. | B65G 13/07 |
| | | | | 198/790 |
| 2021/0347573 | A1 | 11/2021 | Valentini | |

FOREIGN PATENT DOCUMENTS

| | | | |
|---|---|---|---|
| GB | 1467686 A | 3/1977 | |
| WO | 2020079506 A1 | 4/2020 | |

\* cited by examiner

ROLLER CONVEYOR

The present invention relates to a roller conveyor.

The roller conveyor according to the invention is particularly suitable for transporting slabs of glass in an ink jet decorating machine. The roller conveyor according to the invention is however suitable for transporting objects of any type along a predefined advancement direction, and for different purposes from decoration.

Various types of roller conveyors are currently available.

In general, a roller conveyor comprises a plurality of rollers arranged tangential to a transport plane.

The rollers have an outer surface, intended to enable the resting of objects to be transported. The outer surfaces of the various rollers, cylindrical and having the same diameter as one another, are tangential to the transport plane.

To enable the transport of objects, the rollers are driven in rotation by means of a motor. The motor is connected to the rollers by means of a transmission that can comprise a belt, a chain, a gear train or the like.

A very common transmission system envisages the use of a belt for connecting the motor to the various rollers of the conveyor. In current devices the belt is in contact with an end portion of the rollers that is distinct from the outer surface on which the objects to be transported are resting. Such end portion has a different diameter with respect to the outer surface of the rollers. If the end portions of the rollers do not have the same diameter, due to a number of manufacturing errors, or if there is eccentricity with respect to the outer surface of the respective roller, the peripheral speeds of the outer surfaces of the various rollers are not the same as one another. This implies an irregular transport speed of the objects, and it is also possible that the objects undergo orientation variations and unexpected and undesired rotations.

The applicant has devised a very effective solution for resolving the drawbacks summarised above. Such a solution, described in publication WO2020/079506, includes a roller conveyor, comprising a plurality of rollers each of which has a cylindrical outer surface, arranged to allow the support of an object to be transported, which is tangential to a transport plane on which the transport of the objects occurs. A transmission element kinematically connects the motor to the rollers. The transmission element is placed in contact with a portion of the outer surface tangential to the transport plane. A plurality of presser rollers is placed in contact with the transmission element, on the opposite side with respect to the rollers, so as to press the transmission element into contact with the outer surfaces. Such presser rollers are positioned in the sections of the transmission element which are located between two side-by-side rollers.

Thereby, all the rollers are driven in rotation at substantially equal speeds to each other.

The applicant has found that the aforesaid solution can be further improved.

In particular, each presser roller, which is positioned at a respective section of the transmission element between two side-by-side rollers, produces a stretching or elongation of the transmission element. This is because the presser rollers do not have a contrast placed on the opposite side of the transmission element. The stretching produced by the presser rollers causes an oscillation of the speed of the transmission element, especially when the latter is in the form of a belt. Such an oscillation, although reduced, is however to be limited as much as possible.

The object of the present invention is to offer a roller conveyor which enables the drawbacks summarised above to be overcome.

An advantage of the conveyor according to the present invention is that it allows the same peripheral speeds to be obtained for all the rollers, so that the transported objects advance in a regular and uniform manner, without undergoing any speed variations.

Additional features and advantages of the present invention will become more apparent from the following detailed description of an embodiment of the invention, illustrated by way of non-limiting example in the appended figures, in which.

Figure 1:
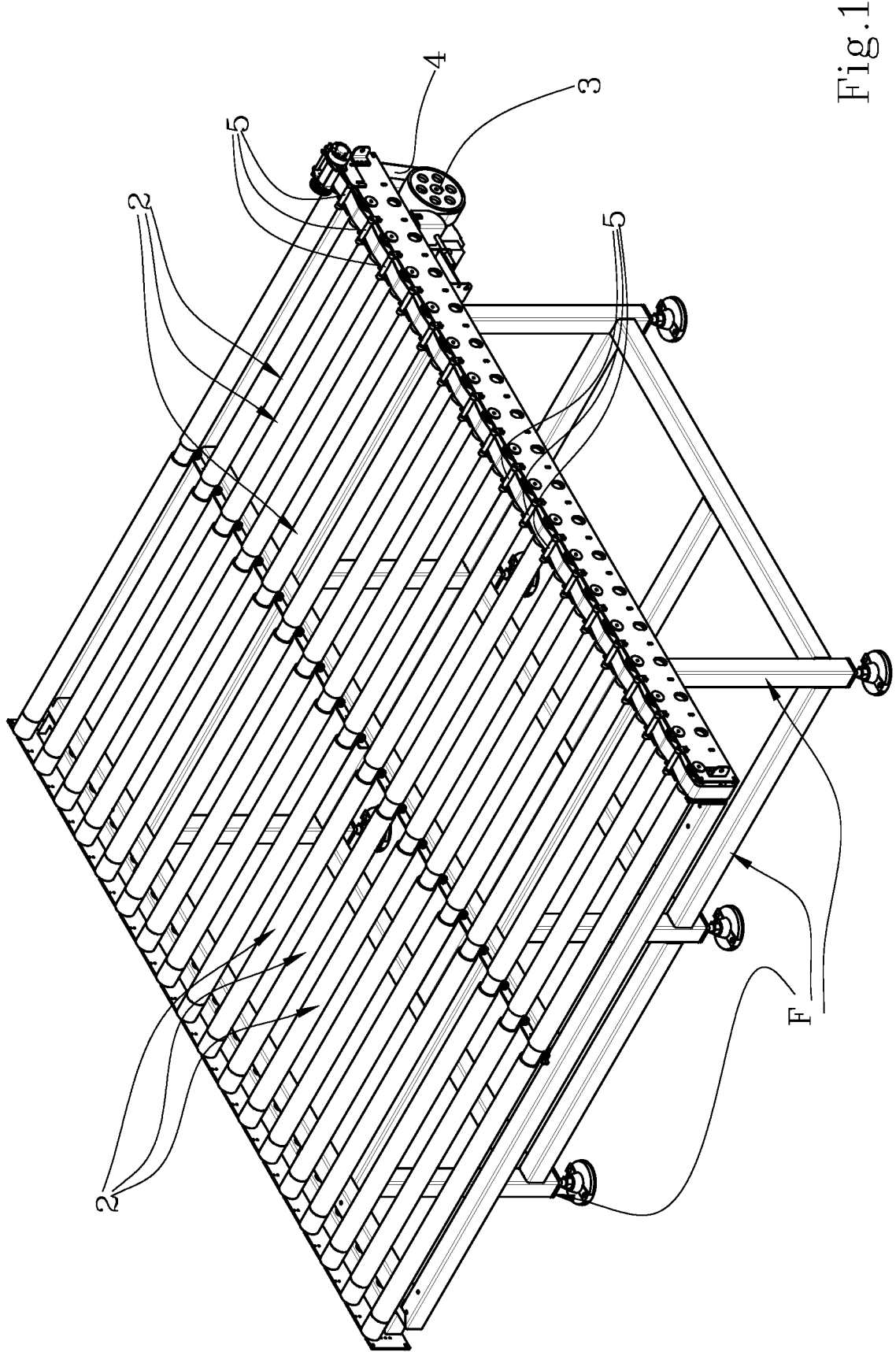
FIG. 1 shows a schematic isometric view of a conveyor according to the present invention.
Figure 2:
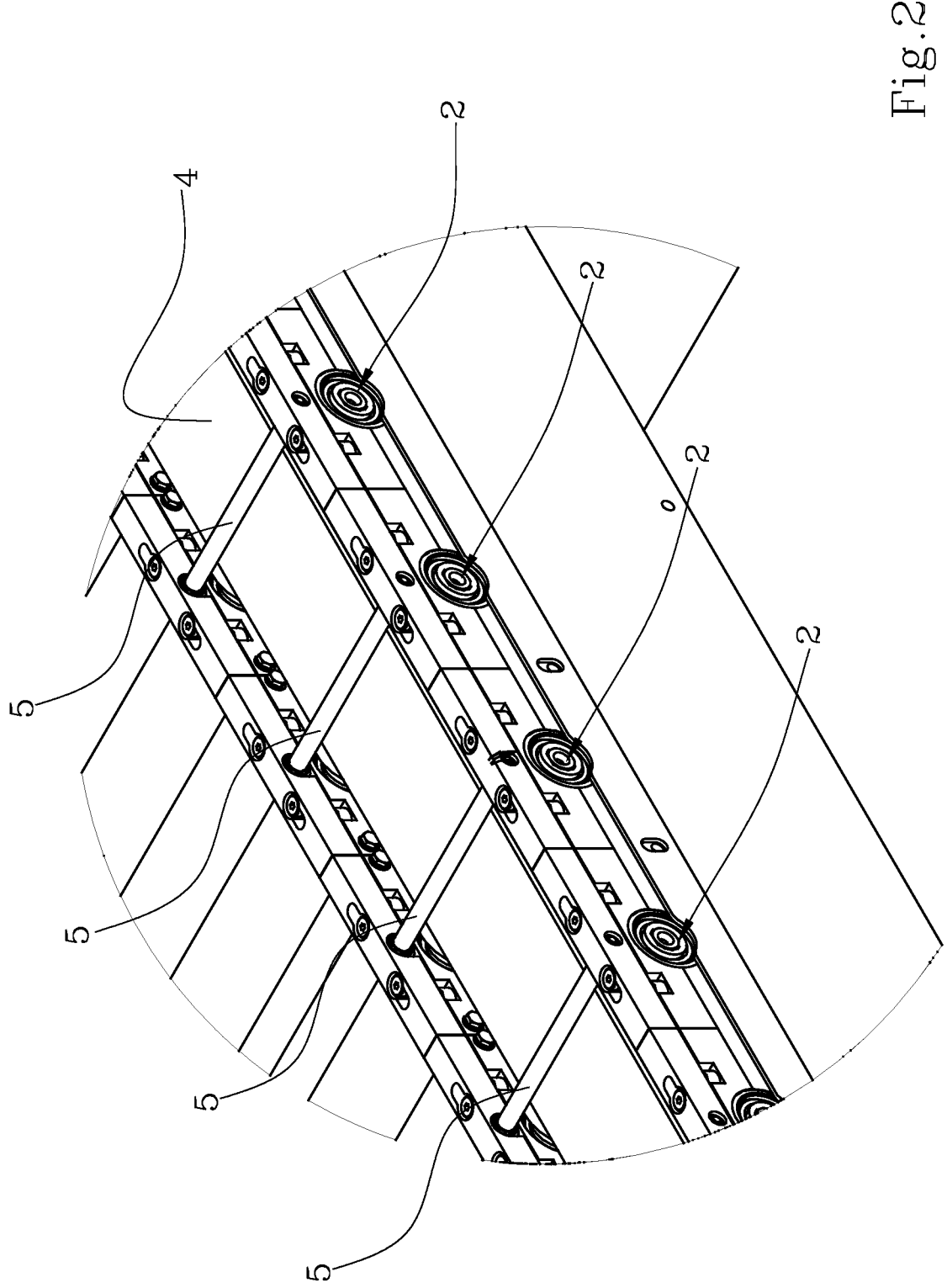
FIG. 2 shows an enlargement of FIG. 1.
Figure 3:
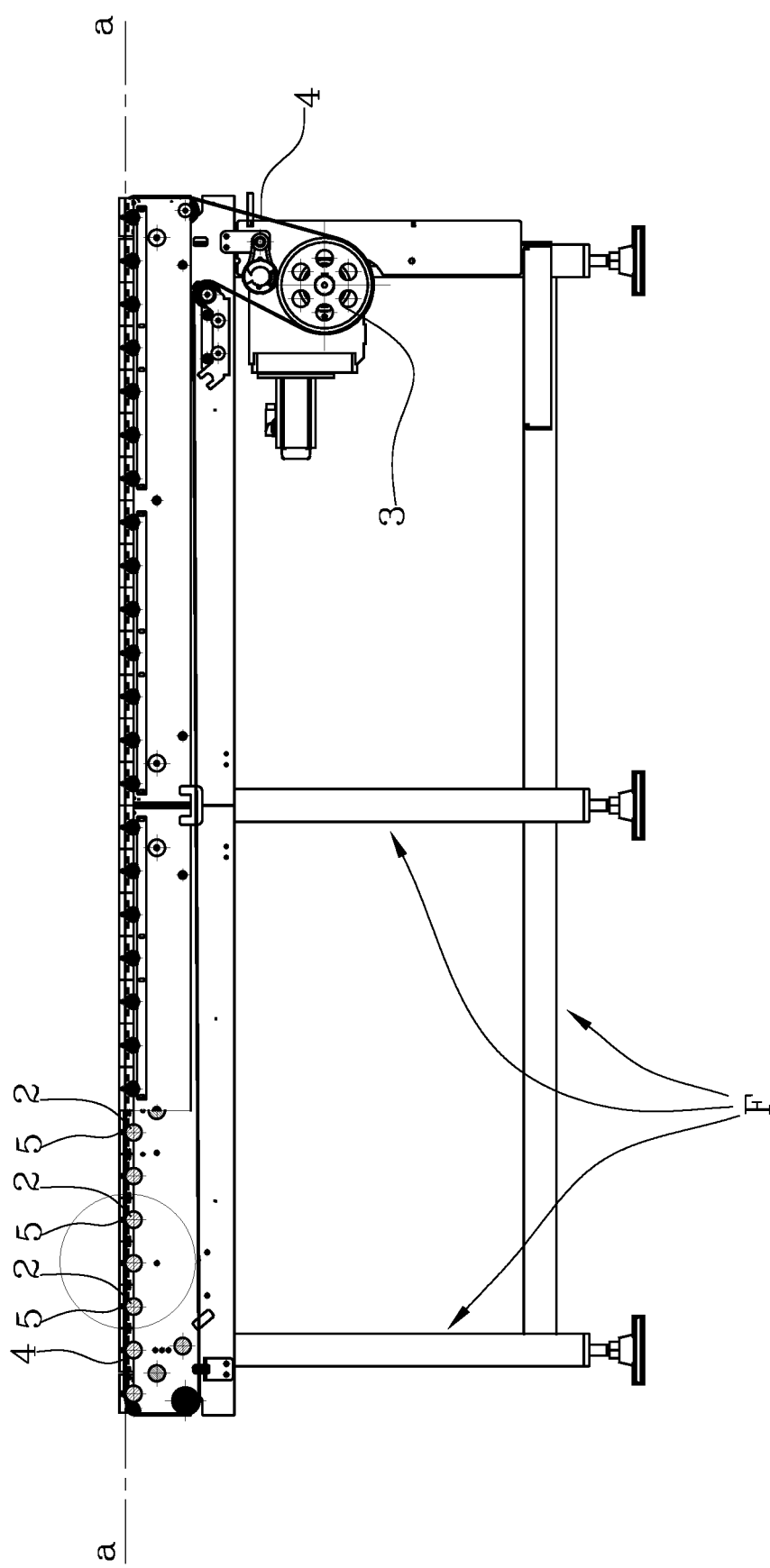
FIG. 3 shows a side view of the conveyor of FIG. 1.
Figure 4:
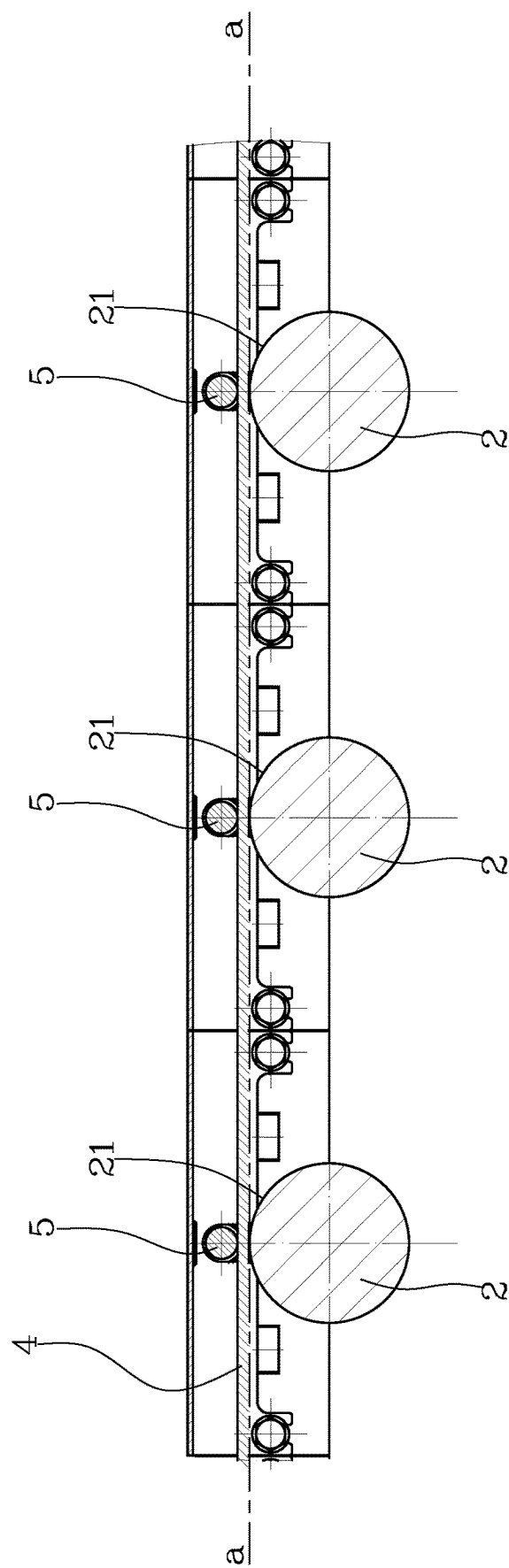
FIG. 4 shows a sectional view of the circled area of FIG. 2.

The roller conveyor according to the present invention comprises a plurality of driven rollers (2) each of which has a cylindrical outer surface (21), arranged to enable the support of an object to be transported.

The driven rollers (2) are driven in rotation by means of a rotary motor (3), e.g., an electric motor. The motor (3) is connected to the driven rollers (2) by means of a transmission device which transfers the rotation of the motor (3) to the driven rollers (2). The concordant rotation of the driven rollers (2) causes the advancement of the objects, resting on the driven rollers (2) themselves, along a transport direction on the transport plane (a).

The outer surfaces (21) of the driven rollers (2) are tangential to a transport plane (a). The transport plane (a) is preferably horizontal, but it could assume different inclinations with respect to the horizontal. The transport plane (a) is the plane on which the transport of the objects takes place, i.e., it is the plane on which the objects enter into contact with the outer surfaces (21) of the driven rollers (2) during the advancement in the transport direction. The driven rollers (2) rotate about respective rotation axes lying on a plane substantially parallel to the transport plane (a). A support frame (F) rotatably supports the driven rollers (2) at the ends thereof, and also enables the resting of the conveyor on the ground.

The transmission device comprises a transmission element (4), which kinematically connects the motor (3) to the driven rollers (2). One or more idler wheels can be interposed between the motor (3) and the driven rollers (2), to guide the transmission element (4) in relation to the relative position between the motor (3) and the driven rollers (2) and to the overall conformation of the conveyor.

The contact between the transmission element (4) and the outer surface (21) takes place on a portion of the outer surface (21) tangential to the transport plane (a). In other words, the transmission element (4) is placed in contact with the outer surface (21) of the driven rollers (2), or in contact with a portion of the driven rollers (2) which has the same diameter as the outer surface (21), tangential to the transport plane (a). In the preferred embodiment, the transmission element (4) is placed in contact with the outer surface (21) of the driven rollers (2) so as to transfer the motion to the outer surface (21) itself. This means that the outer surfaces (21) of the various driven rollers (2) necessarily have a peripheral speed equal to the speed of the transmission element (4), and therefore have the same peripheral speed as one another. Such equal peripheral speed condition between the outer surfaces (21) also occurs if the outer surfaces (21) do not have exactly the same diameter, or even have a different diameter.

The solution of placing the transmission element (4) in contact with the outer surface (21) of the driven rollers (2), or however of making the transmission element (4) interact with a portion of the driven rollers (2) which has the same diameter as the outer surface (21), therefore allows a movement to be performed such that all the driven rollers (2) have the same peripheral speed at the outer surface (21) tangential to the transport plane (a). This enables the objects to be transported in advancement with great precision, without producing undesired vibrations or rotations.

In the embodiment represented, which is preferred but not exclusive, the transmission element (4) comprises a flat belt. The belt (4) is a closed loop along a path which comprises a drive pulley, solidly constrained to the motor (3), one or more idler wheels and the driven rollers (2). In particular, the section of the path followed by the belt (4) which is tangential to the outer surfaces (21) of the driven rollers (2), substantially lies on the transport plane (a).

The conveyor comprises a plurality of presser rollers (5), placed in contact with the transmission element (4), on the opposite side with respect to the driven rollers (2). Each presser roller (5) is arranged abutting a respective driven roller (2) so that the transmission element (4) is compressed between the driven roller (2) and the respective presser roller (5).

In particular, each presser roller (5) is arranged with the rotation axis thereof on a plane, perpendicular to the transport plane (a), which also contains the rotation axis of the driven roller (2) placed abutting the presser roller (5) itself. In other words, the thrust exerted by the presser roller (5) towards the transmission element (4) lies on a plane which contains the rotation axes of the presser roller (5) and of the driven roller (2) and with both axes perpendicular to the transport plane (a). The thrust exerted by the presser roller (5) is perpendicular to the transport plane (a) and to the section of the transmission element (4) compressed between the presser roller (5) and the driven roller (2). This applies to each pair formed by a driven roller (2) and a presser roller (5).

In practice, the transmission element (4) is arranged between the pairs formed by a driven roller (2) and a presser roller (5). Furthermore, the transmission element (4) is pressed in contact with each driven roller (2) by means of the respective presser roller (5).

By virtue of the presence of the presser rollers (5), the transmission element (4) is pressed in contact with the driven rollers (2), remaining well adhered to the latter without undergoing stretching. This is because each presser roller (5) is arranged abutting a respective driven roller (2). Thereby, the pressure exerted by each presser roller (5) is counteracted by a driven roller (2), so that the transmission element (4) is compressed, without being substantially elongated. In practice, the presser roller (5) can be driven abutting the driven roller (2) through an elastic element such as a spring known in the art and not further described.

The presser rollers (5) are arranged substantially parallel to the driven rollers (2). The outer surfaces of the presser rollers (5) are tangential to the transport plane (a). Thereby, the transmission element (4), in the form of a belt, is arranged according to a straight path, substantially lying on the transport plane (a). In other words, the presser rollers (5) can be superposed with the driven rollers (2) in the tangential point with the transport plane, i.e., each presser roller (5) can be arranged with the rotation axis thereof coplanar to the rotation axis of a respective driven roller (2). As already indicated, the belt is interposed between the driven roller (2) and the presser roller (5) superimposed thereon.

The conveyor according to the present invention can be used in a machine for the digital printing of slabs of glass or other materials. The machine comprises at least one ink jet printing head, of the type known in the art. A transport line is arranged for transporting the slabs in advancement from an inlet zone to an outlet zone, transiting below the printing head. The transport line comprises a conveyor (1) according to the present invention.

In the printing of slabs of glass, and in particular of slabs intended for the production of car windows, very high precision printing is required, for producing small writing and codes, and for the creation of opaque edge zones, designed for protecting the glue that joins the windows to the bodywork of the car from solar radiation. The use of the conveyor (1) according to the present invention ensures the very precise and uniform transport of slabs, which prevents undesired rotations of the slabs themselves. This ensures that the slabs are presented to the printing head in a very precise and predefined position, so that the printing can be applied as envisaged for obtaining the desired graphics.

Figure 5B:
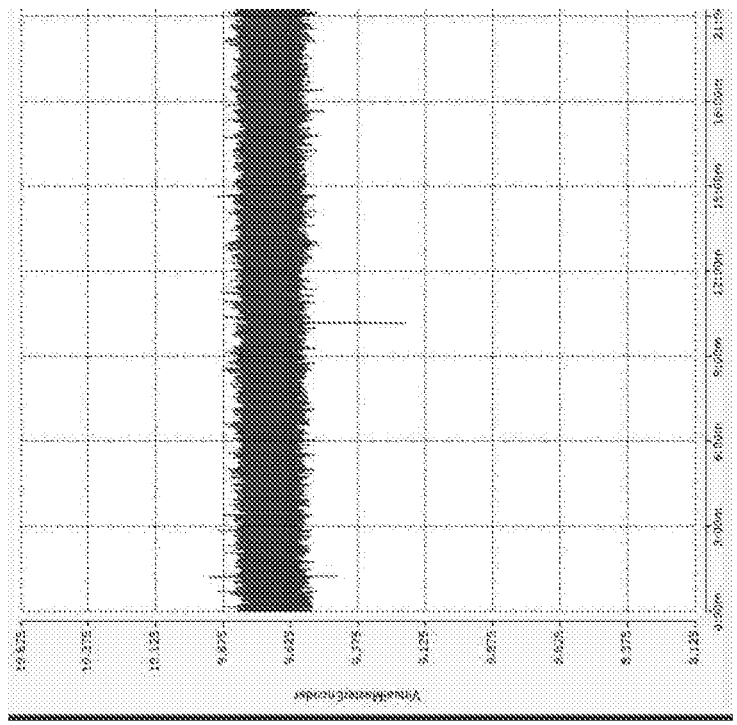
FIGS. 5a and 5b show a comparison of two graphs, respectively referring to the prior art and the conveyor according to the present invention; the graphs show the time in abscissa and the peripheral speed of the rollers in ordinate.
Figure 5A:
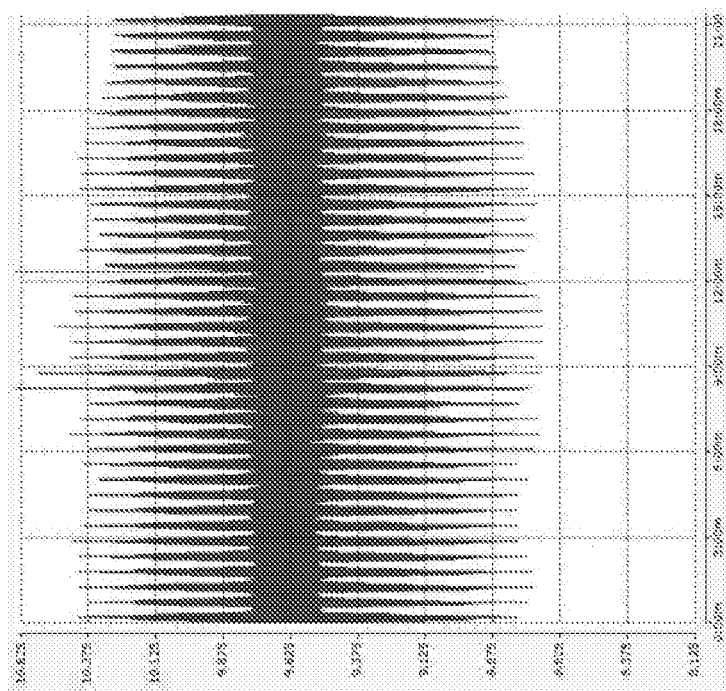

FIGS. 5a and 5b experimentally show the remarkable reduction of the peripheral speed variations of the rollers. FIG. 5a shows the peripheral speed variations of the rollers in a solution of the prior art. FIG. 5b instead shows the variation of the peripheral speed of the rollers in the conveyor according to the present invention.

The invention claimed is:

1. A roller conveyor, comprising:
   a plurality of driven rollers (2) each of which has a cylindrical outer surface (21), arranged to allow the support of an object to be transported, which is tangential to a transport plane (a) on which the transport of the objects occurs;
   a motor (3);
   a transmission element (4), which kinematically connects the motor (3) to the driven rollers (2) and is placed in contact with a portion of the outer surface (21) tangential to the transport plane (a); and
   a plurality of presser rollers (5), placed in contact with the transmission element (4), on the opposite side with respect to the driven rollers (2), each of said presser rollers (5) being arranged abutting a respective driven roller (2), so as to press the transmission element (4) between itself and the respective driven roller (2).

2. The conveyor according to claim 1, wherein the transmission element (4) comprises a flat belt.

3. The conveyor according to claim 1, wherein each presser roller (5) is arranged with the rotation axis thereof on a plane perpendicular to the transport plane (a).

4. The conveyor according to claim 1, wherein the rotation axis of the presser roller (5) and the rotation axis of the driven roller (2) are placed on the same plane perpendicular to the transport plane (a).

5. The conveyor according to claim 1, wherein each driven roller (2) is provided with a presser roller (5) configured to exert a direct thrust towards the transmission element (4).

6. The conveyor according to the claim 1, wherein said transport plane (P) is substantially horizontal.

7. A machine for digitally printing glass sheets or other materials, comprising a printhead and a transport line for the sheets, arranged to lead the sheets below the printhead, and the transport line comprises a roller conveyor (1) according to claim 1.

* * * * *